United States Patent
Hannula et al.

(10) Patent No.: US 10,658,747 B2
(45) Date of Patent: May 19, 2020

(54) ANTENNA ARRANGEMENT AND METHOD FOR ANTENNA ARRANGEMENT

(71) Applicant: HUAWEI TECHNOLOGIES CO., LTD., Shenzhen, Guangdong (CN)

(72) Inventors: Jari-Matti Hannula, Kista (SE); Ville Viikari, Kista (SE); Risto Valkonen, Kista (SE); Janne Ilvonen, Kista (SE)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 16/162,284

(22) Filed: Oct. 16, 2018

(65) Prior Publication Data
US 2019/0051981 A1    Feb. 14, 2019

Related U.S. Application Data

(63) Continuation of application No. PCT/EP2016/068058, filed on Jul. 28, 2016.

(30) Foreign Application Priority Data

Apr. 20, 2016  (WO) ............ PCT/EP2016/058755

(51) Int. Cl.
*H01Q 1/52* (2006.01)
*H01Q 21/00* (2006.01)
(Continued)

(52) U.S. Cl.
CPC .......... *H01Q 1/523* (2013.01); *H01Q 1/243* (2013.01); *H01Q 21/0006* (2013.01);
(Continued)

(58) Field of Classification Search
CPC ...... H01Q 1/246; H01Q 21/24; H01Q 21/065; H01Q 21/064; H01Q 21/062; H01Q 25/00;
(Continued)

(56) References Cited

U.S. PATENT DOCUMENTS 6,304,214 B1   10/2001   Aiken et al.
9,960,883 B1    5/2018   Chakraborty
(Continued)

FOREIGN PATENT DOCUMENTS

CN   1273463 A   11/2000
CN   1490940 A    4/2004
(Continued)

OTHER PUBLICATIONS

Jari-Matti Hannula et al.,"Concept for Frequency Reconfigurable Antenna Based on Distributed Transceivers", IEEE Antennas and Wireless Propagation Letters, vol. 15, 2016, 4 pages.
(Continued)

*Primary Examiner* — Ajibola A Akinyemi
(74) *Attorney, Agent, or Firm* — Womble Bond Dickinson (US) LLP (57) ABSTRACT

An antenna arrangement is described. The antenna arrangement comprises an antenna array that includes a first antenna element having a first feed point, and a second antenna element having a second feed point. The antenna arrangement further comprises a signal processing device configured to receive an input signal (Sin), obtain a first complex weight ($w_1$), obtain a second complex weight ($w_2$), generate a first feed signal ($a_1$) based on the input signal (Sin) and the first complex weight ($w_1$), generate a second feed signal ($a_2$) based on the input signal (Sin) and the second complex weight ($w_2$), provide the first feed signal ($a_1$) to the first feed point, and provide the second feed signal ($a_2$) to the second feed point so as to control the frequency characteristic of the antenna array. A method for such an antenna arrangement is also described.

13 Claims, 6 Drawing Sheets

(51) Int. Cl.
*H01Q 1/24* (2006.01)
*H04B 7/06* (2006.01)
*H04B 1/40* (2015.01)
*H04B 7/0404* (2017.01)
*H04B 7/0413* (2017.01)
*H04B 7/08* (2006.01)

(52) U.S. Cl.
CPC ............. *H04B 1/40* (2013.01); *H04B 7/0404* (2013.01); *H04B 7/0413* (2013.01); *H04B 7/0617* (2013.01); *H04B 7/086* (2013.01)

(58) Field of Classification Search
CPC   H01Q 1/48; H01Q 21/29; H01Q 1/50; H01Q 25/005; H01Q 3/26; H01Q 21/0006; H01Q 21/22; H01Q 3/40; H01Q 3/36; H01Q 1/243
USPC .......................................................... 455/77
See application file for complete search history.

(56) References Cited

U.S. PATENT DOCUMENTS

| | | | |
|---|---|---|---|
| 2009/0185533 A1 | 7/2009 | Kim et al. | |
| 2012/0133571 A1 | 5/2012 | Collins et al. | |
| 2012/0196637 A1* | 8/2012 | Bergman | H04B 7/0404 455/509 |
| 2012/0258660 A1* | 10/2012 | Rajendran | H04B 5/0031 455/41.1 |
| 2013/0027241 A1* | 1/2013 | Sego | G01S 13/4445 342/149 |
| 2013/0178181 A1 | 7/2013 | Pohlabeln et al. | |
| 2013/0235806 A1 | 9/2013 | Nilsson et al. | |
| 2013/0241798 A1* | 9/2013 | Lee | H01C 21/50 343/876 |
| 2014/0044021 A1 | 2/2014 | Alberth et al. | |
| 2014/0062813 A1 | 3/2014 | Alrabadi et al. | |
| 2016/0079683 A1 | 3/2016 | Lee et al. | |

FOREIGN PATENT DOCUMENTS

| | | |
|---|---|---|
| CN | 102474001 A | 5/2012 |
| CN | 102948016 A | 2/2013 |
| CN | 103201900 A | 7/2013 |
| CN | 103326104 A | 9/2013 |
| CN | 104737453 A | 6/2015 |
| CN | 108736949 A | 11/2018 |
| EP | 2107636 A1 | 10/2009 |
| EP | 2642590 A1 | 9/2013 |

OTHER PUBLICATIONS

Jari-Matti Hannula et al.,"5G Antennas Progress report", Dec. 2015, 11 pages.

Jari-Matti Hannula et al.,"Frequency Reconfigurable Antenna Without Matching Network", Hannula and Viikari: Frequency Reconfigurable Antenna Without Matching Network, 3 pages.

* cited by examiner

ANTENNA ARRANGEMENT AND METHOD FOR ANTENNA ARRANGEMENT

CROSS-REFERENCE TO RELATED APPLICATIONS

This application is a continuation of International Application No. PCT/EP2016/068058, filed on Jul. 28, 2016, which claims priority to International Patent Application No. PCT/EP2016/058755, filed on Apr. 20, 2016. The disclosures of the aforementioned applications are hereby incorporated by reference in their entireties.

TECHNICAL FIELD

The present disclosure relates to an antenna arrangement and to a method for controlling such an antenna arrangement.

BACKGROUND

Antennas continue to have increasingly strict performance requirements as the communications technology development continues. Especially, the mobile industry continues to develop new techniques to improve the data rate of the mobile devices. This requires the use of new frequencies and wider bandwidths. This means that the antenna must be operated at different frequencies. Obtaining efficient operation over all the required frequencies is challenging, especially with the limited space available for the antennas in the mobile device.

An antenna of a mobile device does not have to function at all operating frequencies simultaneously, making it possible to circumvent the bandwidth requirements via frequency reconfigurability. Instead of covering all the operating frequencies simultaneously, only the required bands are covered at a time.

Existing antenna arrangements which provide frequency re-configurability include matching networks with tunable capacitors and switchable matching networks. These antenna arrangements have separate matching circuits for the separate frequency bands, and the matching circuit is selected via switching. Multiple matching networks require lots of space on the circuit board. They also introduce power losses to the system. Furthermore, there are no matching networks that tune both low and high frequency bands independently. Independent tuning is needed for realizing intra-band carrier aggregation. Alternatively, the antenna element itself can be made reconfigurable by modifying the antenna geometry. Positive Intrinsic Negative (PIN) diodes are commonly used to redirect the flow of the currents in the antenna, therefore modifying the operation.

It is often necessary to fit several antennas on the same mobile device for Multiple-Input and Multiple-Output (MIMO) operation or for different wireless communication systems. Fitting all these antennas on the small device reduces the volume available for a single antenna, which further reduces their bandwidth. This also results in the additional requirement of adequate isolation between the antenna elements. The isolation is often increased via the use of specific decoupling networks. However, existing decoupling networks do not allow tunability of the isolation.

SUMMARY

An objective of the present disclosure is to provide an antenna arrangement which provides frequency reconfigurability and which diminishes the problems with conventional solutions.

A further objective of the present disclosure is to provide an antenna arrangement which provides frequency reconfigurability without having separate matching circuits for the separate frequency bands.

The above objectives are fulfilled by the subject matter of the independent claims. Further advantageous implementation forms of the present disclosure can be found in the dependent claims.

According to a first aspect of the present disclosure an antenna arrangement is provided. The antenna arrangement comprises an antenna array that comprises a first antenna element including a first feed point, and a second antenna element including a second feed point. The first antenna element and the second antenna element have different physical dimensions. The antenna arrangement also comprises a signal processing device configured to receive an input signal, obtain a first complex weight, obtain a second complex weight, generate a first feed signal based on the input signal and the first complex weight, generate a second feed signal based on the input signal and the second complex weight, provide the first feed signal to the first feed point and provide the second feed signal to the second feed point so as to control the frequency characteristic of the antenna array.

The frequency characteristics of an antenna arrangement according to the first aspect of the present disclosure may be controlled without the need for matching networks and decoupling networks.

In one embodiment, the first feed signal and the second feed signal differ only in phase and amplitude. This means that signals having the same shape are fed to the different antenna elements. This makes the output signal from the antenna array predictable and easy to control.

In one embodiment, the first feed signal and the second feed signal comprise a common carrier frequency, and the first complex weight and the second complex weight depend on the common carrier frequency. By having the first complex weight and the second complex weight dependent on the common carrier frequency the control of the frequency characteristic of the antenna array may be made more precise.

In one embodiment, a mutual distance between the first antenna element and the second antenna element is smaller than the wavelength of the common carrier frequency. By having such a mutual distance between the first antenna element and the second antenna element an electromagnetic coupling between the first antenna element and the second antenna is ensured.

In one embodiment, the first complex weight and the second complex weight are based on an electromagnetic scattering between the first antenna element and the second antenna element. The scattering between the first antenna element and the second antenna element defines the electromagnetic coupling between the first antenna element and the second antenna element. Thus, by basing the first complex weight and the second complex weight on the electromagnetic scattering a good control of the antenna arrangement is possible.

In one embodiment, the signal processing device is configured to provide a first pilot signal to the first feed point and receive first pilot return signals at the first feed point and the second feed point, provide a second pilot signal to the second feed point and receive second pilot return signals at the first feed point and the second feed point. The signal processing device is also configured to determine the electromagnetic scattering by determining corresponding scattering parameters based on the first pilot signal, the second pilot signal, the first pilot return signals, and the second pilot return signals. By determining the scattering parameters by such a measurement a precise control of the frequency characteristics of the antenna arrangement may be achieved.

In one embodiment, the provision of the first feed signal to the first feed point and the second feed signal to the second feed point results in a first return signal at the first feed point and a second return signal at the second feed point, wherein the first return signal and the second return signal are determined by the scattering parameters. Furthermore, the signal processing device is configured to choose the first complex weight and second complex weight, and thereby the first feed signal and the second feed signal, so that the sum of the first return signal and the second return signal is below a predetermined threshold value. By configuring the signal processing device in this way the frequency characteristics of the antenna arrangement may easily be optimized.

In one embodiment, the signal processing device is configured to provide the first pilot signal and the second pilot signal in different time periods. The measurement of the scattering parameters is more reliable when the first pilot signal and the second pilot signal are provided in different time periods.

Irrespective of whether the signal processing device is configured to measure the scattering parameters or not the complex weights may be stored in a memory. Thus, in an eighth possible implementation form of an antenna arrangement according to any of the possible implementation forms or to the first aspect as such, the signal processing device is configured to retrieve the first complex weight and the second complex weight from a memory. The operation of the signal processing device is fast when the first complex weight and the second complex weight may be retrieved from a memory.

In one embodiment, the first antenna element and the second antenna element each has a length in the interval 5 mm to 100 mm, and preferably in the interval 10 mm to 50 mm. The length of the antenna elements may be chosen so that they have a resonance frequency in or close to a frequency band used in mobile communications and/or so that they fit inside a mobile device, such as a cellular phone. The length is a total length of the first antenna element and the second antenna element. Alternatively, the whole mobile device may operate as the antenna. In this case individual antenna elements are not resonant without the device. The first antenna element and the second antenna element do not have to be straight but can have a bent configuration.

In one embodiment, the signal processing device may comprise at least a first transceiver associated with the first feed point, and a second transceiver associated with the second feed point. By having a separate transceiver for each feed point the antenna arrangement is more easily controlled compared to when the same transceiver is used for two or more antenna elements.

In one embodiment, the signal processing device comprises a printed circuit board with a top plane and a bottom plane, wherein the first antenna element extends from the top plane and the second antenna element extends from the bottom plane. By having the antenna elements extending from different planes a better separation of the antenna elements is provided.

According to a second aspect of the present disclosure a (e.g. mobile) communication device is provided, which (mobile) communication device comprises an antenna arrangement according to any of the possible implementation forms.

According to a third aspect a method for an antenna arrangement comprising an antenna array is provided. The antenna array comprises a first antenna element including a first feed point, and a second antenna element including a second feed point. The method comprises receiving an input signal, obtaining a first complex weight, obtaining a second complex weight, generating a first feed signal based on the input signal and the first complex weight, and generating a second feed signal based on the input signal and the second complex weight. The method also comprises providing the first feed signal to the first feed point and providing the second feed signal to the second feed point so as to control the frequency characteristic of the antenna array.

With a method according to the third aspect the frequency characteristics of the antenna arrangement may be controlled without the need for matching networks and decoupling networks.

In one embodiment, the first feed signal and the second feed signal differ only in phase and amplitude. This means that the signals having the same shape is fed to the different antenna elements. This makes the output signal from the antenna array predictable and easy to control.

In one embodiment, the first feed signal and the second feed signal comprise a common carrier frequency. Furthermore, the first complex weight and the second complex weight depend on the common carrier frequency. By having the first complex weight and the second complex weight dependent on the common carrier frequency the control of the frequency characteristic of the antenna array may be made more precise.

In one embodiment, the first complex weight and the second complex weight are based on an electromagnetic scattering between the first antenna element and the second antenna element. The scattering between the first antenna element and the second antenna element defines the electromagnetic coupling between the first antenna element and the second antenna element. Thus, by basing the first complex weight and the second complex weight are based on the electromagnetic scattering a good control of the antenna arrangement is possible.

In one embodiment, the method comprises providing a first pilot signal to the first feed point and receiving first pilot return signals at the first feed point and the second feed point, providing a second pilot signal to the second feed point and receiving second pilot return signals at the first feed point and the second feed point. The method also comprises determining the electromagnetic scattering by determining corresponding scattering parameters based on the first pilot signal, the second pilot signal, the first pilot return signals, and the second pilot return signals. By determining the scattering parameters by such a measurement a precise control of the frequency characteristics of the antenna arrangement may be achieved.

In one embodiment, the method comprises providing the first feed signal to the first feed point and the second feed signal to the second feed point, resulting in a first return signal at the first feed point and a second return signal at the second feed point, wherein the first return signal and the second return signal are determined by the scattering parameters. The method also comprises choosing the first complex weight and the second complex weight, and thereby the first feed signal and the second feed signal, so that the sum of the first return signal and the second return signal is below a predetermined threshold value. This method provides for an easy optimization of the frequency characteristics of the antenna arrangement.

In one embodiment, the first pilot signal and the second pilot signal are provided in different time periods. The measurement of the scattering parameters is more reliable when the first pilot signal and the second pilot signal are provided in different time periods.

According to a fourth aspect a computer program with a program code is provided for performing a method according to the third aspect as such or to the method according to any of the first to sixth possible implementation forms, when the computer program runs on a computer.

A number of antenna arrangements according to any of the first to the seventh implementation forms of the first aspect or to the first aspect as such may be configured in the same device on the same frequency to realize the a multiple-input multiple-output (MIMO) system.

SHORT DESCRIPTION OF THE DRAWINGS

FIG. 5b is a plan view of the antenna arrangement in FIG. 5a.

DETAILED DESCRIPTION

In the following description embodiments of the invention the same reference numerals will be used for the same features in the different drawings.

Figure 1:
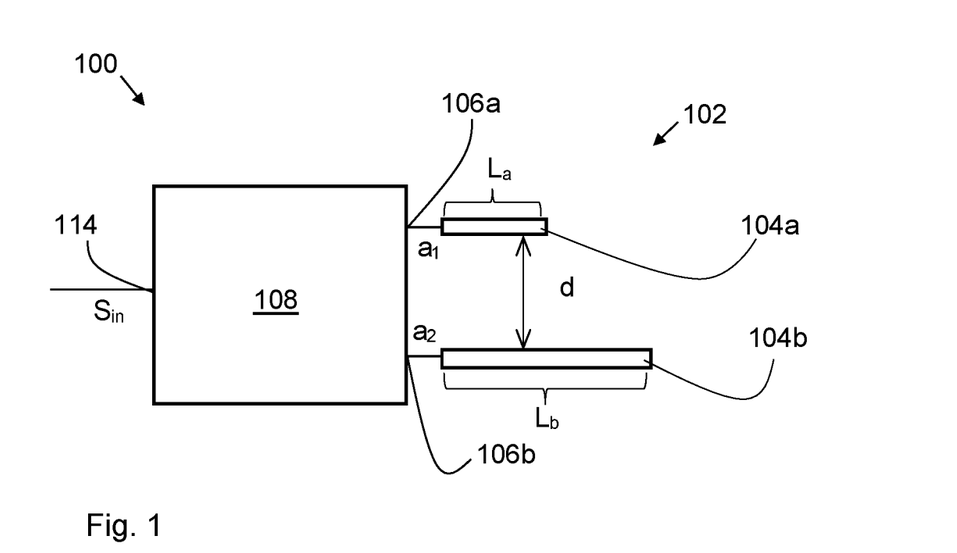
FIG. 1 shows schematically a signal processing arrangement for a transmitter according to an embodiment of the present invention.

FIG. 1 shows schematically an antenna arrangement 100 according to an embodiment of the present invention. The antenna arrangement 100 comprises an antenna array 102 comprising a first antenna element 104a including a first feed point 106a, and a second antenna element 104b including a second feed point 106b. The first antenna element 104a and the second antenna element 104b have different physical dimensions as is shown by their different lengths in FIG. 1. The first antenna element 104a and the second antenna element 104b each has a length $L_a$, $L_b$ in the interval 5 mm to 100 mm, and preferably in the interval 10 mm to 50 mm. The different physical dimensions of the first antenna element 104a and the second antenna element 104b mean that they have different electromagnetic resonance frequencies. The antenna arrangement 100 comprises a signal processing device 108 having an input 114. The signal processing device 108 is configured to receive an input signal Sin on the input 114. The signal processing device 108 is configured to obtain a first complex weight $w_1$, and to obtain a second complex weight $w_2$. The first complex weight $w_1$ and the second complex weight $w_2$ may be obtained in one of many different ways as will be described in more detail below. The signal processing device 108 is further configured to generate a first feed signal $a_1$ based on the input signal Sin and the first complex weight $w_1$, to generate a second feed signal $a_2$ based on the input signal Sin and the second complex weight $w_2$, to provide the first feed signal $a_1$ to the first feed point 106a and provide the second feed signal $a_2$ to the second feed point 106b so as to control the frequency characteristic of the antenna array 102.

Thus, the first complex weight $w_1$ and the second complex weight $w_2$ are chosen to achieve the desired frequency characteristics of the antenna array. A portion of the signal from the first antenna element 104a will reflect back and another portion of the signal from the first antenna element 104a couples to the second antenna element 104b. The signal from the first antenna element 104a also interfere with the signal from the second antenna element 104b. Also, a portion of the signal from the second antenna element 104b will reflect back and another portion of the signal from the second antenna element 104b couples to the first antenna element 104a. Thus, by controlling the first complex weight $w_1$ and the second complex weight $w_2$ the signal from the antenna array 102 may be controlled. According to the described embodiment the first feed signal $a_1$ and the second feed signal $a_2$ differ only in phase and amplitude. This is advantageous for control of the total signal from the antenna array 102.

According to the described embodiment the first feed signal $a_1$ and the second feed signal $a_2$ comprise a common carrier frequency fc. As the antenna elements each have a specific resonance frequency the first complex weight $w_1$ and the second complex weight $w_2$ depend on the common carrier frequency fc. In other words, to achieve the desired frequency characteristic the choice of the first complex weight $w_1$ and the second complex weight $w_2$ are made in dependence of the common carrier frequency.

As the antenna arrangement according to the described embodiment relies on the electromagnetic coupling between the antenna elements the mutual distance should not be too large. According to the described embodiment the mutual distance d between the first antenna element 104a and the second antenna element 104b is typically smaller than the wavelength of the common carrier frequency fc. The coupling between the antenna elements depend on the mutual distance between the first antenna element 104a and the second antenna element 104b. Depending on the configuration the mutual distance between the antenna elements may vary along the length of the antenna elements. The distance referred to may be a minimum distance between the first antenna element 104a and the second antenna element 104b.

The electromagnetic reflections and coupling between the first antenna element 104a and the second antenna element 104b may be expressed as the scattering between the first antenna element 104a and the second antenna element 104b. According to the described embodiment the first complex weight $w_1$ and the second complex weight $w_2$ are based on the electromagnetic scattering between the first antenna element 104a and the second antenna element 104b. The scattering is the sum of the reflections back to the first antenna element 104a and the second antenna element 104b and the mutual coupling between the first antenna element 104a and the second antenna element 104b. The scattering may be expressed using scattering parameters $S_{ij}$, which describe the scattering between the i:th antenna element to the j:th antenna element. Thus, e.g., the scattering parameter $S_{11}$ describes the reflection from the first antenna element 104a back to the first antenna element 104a and $s_{21}$ describe the electromagnetic coupling from the second antenna element 104b to the first antenna element 104a. The scattering parameters $S_{ij}$ together form a scattering matrix S. The first feed signal $a_1$ and the second feed signal $a_2$ together form a feed signal vector a. If a feed signal vector a in the form of a first feed signal $a_1$ and a second feed signal $a_2$ is applied on the first feed point 106a and the second feed point 106b, respectively, this will result in a first return signal $b_1$ on the first feed point 106a and a second return signal $b_2$ on the second feed point 106b. The first return signal $b_1$ and the second return signal $b_2$ form a return signal vector b. The return signal vector b depends on the scattering matrix and the feed signal vector in the following way:

$b=Sa$

Thus, when the scattering matrix S is known the feed signal vector can be determined for which the return signal vector is below a desired level.

The scattering matrix may be determined in one of many different ways. The scattering matrix is e.g. dependent on the physical configuration of the antenna array and on the environment in which the antenna array operates. The scattering parameters $S_{ij}$ of the scattering matrix may be calculated or measured during the construction phase of the antenna arrangement or measured in an initializing step for the antenna arrangement. The first complex weight $w_1$, and the second complex weight $w_2$ which give the desired return signal may then be determined and the first complex weight $w_1$ and the second complex weight $w_2$ may be stored in the memory 110 (see for example FIG. 2). When the antenna arrangement operates the signal processing device 108 is configured to retrieve the first complex weight $w_1$ and the second complex weight $w_2$ from the memory 110 and provide the first feed signal $a_1$ based on the input signal Sin and the first complex weight $w_1$, and to provide the second feed signal $a_2$ based on the input signal Sin and the second complex weight $w_2$.

The antenna arrangement 100 may also be configured to adapt the first complex weight $w_1$ and the second complex weight $w_2$ to the environment in which the antenna arrangement operates. To this end, in the described embodiment, the signal processing device 108 is configured to measure the scattering parameters $S_{ij}$ for example in operation. The measurement is done by the signal processing device 108 being configured to measure the scattering parameters $S_{ij}$, the signal processing device 108 is configured to provide a first pilot signal $a_{1p}$ to the first feed point 106a and receive first pilot return signals $b_{1p}$ at the first feed point 106a and the second feed point 106b. The first pilot return signal received at the first feed point 106a is denoted $b_{1p1}$, while the first pilot return signal received at the second feed point 106b is denoted $b_{1p2}$. The signal processing device 108 is also configured to provide a second pilot signal $a_{2p}$ to the second feed point 106b and receive second pilot return signals $b_{2p}$ at the first feed point 106a and the second feed point 106b. The second pilot return signal received at the first feed point 106a is denoted $b_{2p1}$, while the second pilot return signal received at the second feed point 106b is denoted $b_{2p2}$. The signal processing device is configured to determine the electromagnetic scattering parameters $S_{ij}$ using the following equation: $S_{ij}=b_{ip}/a_{jp}$. In order to get a proper measurement of the first pilot return signals $b_{1p}$, and the second pilot return signals $b_{2p}$ the signal processing device 108 is configured to provide the signal processing device 108 is configured to provide the first pilot signal $a_{1p}$ and the second pilot signal $a_{2p}$ in different time periods. The pilot signals $a_{jp}$ are signals used only when measuring the scattering parameters $S_{ij}$. Once the scattering parameters $S_{ij}$ are chosen the antenna arrangement is prepared for sending out signals.

Providing a first feed signal $a_1$ to the first feed point 106a and a second feed signal $a_2$ to the second feed point 106b results in a first return signal $b_1$ at the first feed point 106a and a second return signal $b_2$ at the second feed point 106. The first return signal $b_1$ and the second return signal $b_2$ are determined by the scattering parameters $S_{11}$, $S_{12}$, $S_{21}$, $S_{22}$. The signal processing device 108 is configured to choose the first complex weight $w_1$ and second complex weight $w_2$, and thereby the first feed signal $a_1$ and the second feed signal $a_2$, so that the sum of the first return signal $b_1$ and the second return signal $b_2$ is below a predetermined threshold value. The first feed signal $a_1$ and the second feed signal $a_2$ are determined from the above mentioned equation $b=Sa,$ where the vector a describes the input signal. For example, if a=[1 1 1 1], then each port is fed the same amount of power. Vector b then describes how much power returns back to the ports due to reflections and mutual coupling. Theoretically, it is desirable to minimize the vector b to make the antenna arrangement 100 as efficient as possible. In the ideal case b=[0 0 0 0], so that no power is returned and the efficiency is 100%.

The scattering matrix S describes the reflections and mutual coupling among the feed ports of the antenna. If we have three antenna elements 104a, 104b, 104c, the scattering matrix is $$S = \begin{bmatrix} S_{11} & S_{12} & S_{13} \\ S_{21} & S_{22} & S_{23} \\ S_{31} & S_{32} & S_{33} \end{bmatrix},$$

where S gives the relation between a and b according to $$\begin{bmatrix} b_1 \\ b_2 \\ b_3 \end{bmatrix} = \begin{bmatrix} S_{11} & S_{12} & S_{13} \\ S_{21} & S_{22} & S_{23} \\ S_{31} & S_{32} & S_{33} \end{bmatrix} \begin{bmatrix} a_1 \\ a_2 \\ a_3 \end{bmatrix}.$$

We then calculate the eigenvalues of D, which is related to S according to $D=I-S^H S$. We select the largest eigenvalue. Each eigenvalue has a corresponding eigenvector, so we find the eigenvector of D that corresponds to the largest eigenvalue. This eigenvector of D corresponds to the optimal weight vector a. The values of a are complex numbers.

As stated above the first feed signal $a_1$ is based on the input signal Sin and the first complex weight $w_1$, and the second feed signal $a_2$ is based on the input signal Sin and the second complex weight $w_2$. Thus, the first complex weight $w_1$ and the second complex weight $w_2$ may be calculated when the desired feed signals $a_1$, $a_2$, are known. The forming of the first feed signal $a_1$ and the second feed signal $a_2$ from the input signal Sin will be described in more detail below. The weights may be stored in a memory 110.

Figure 4:
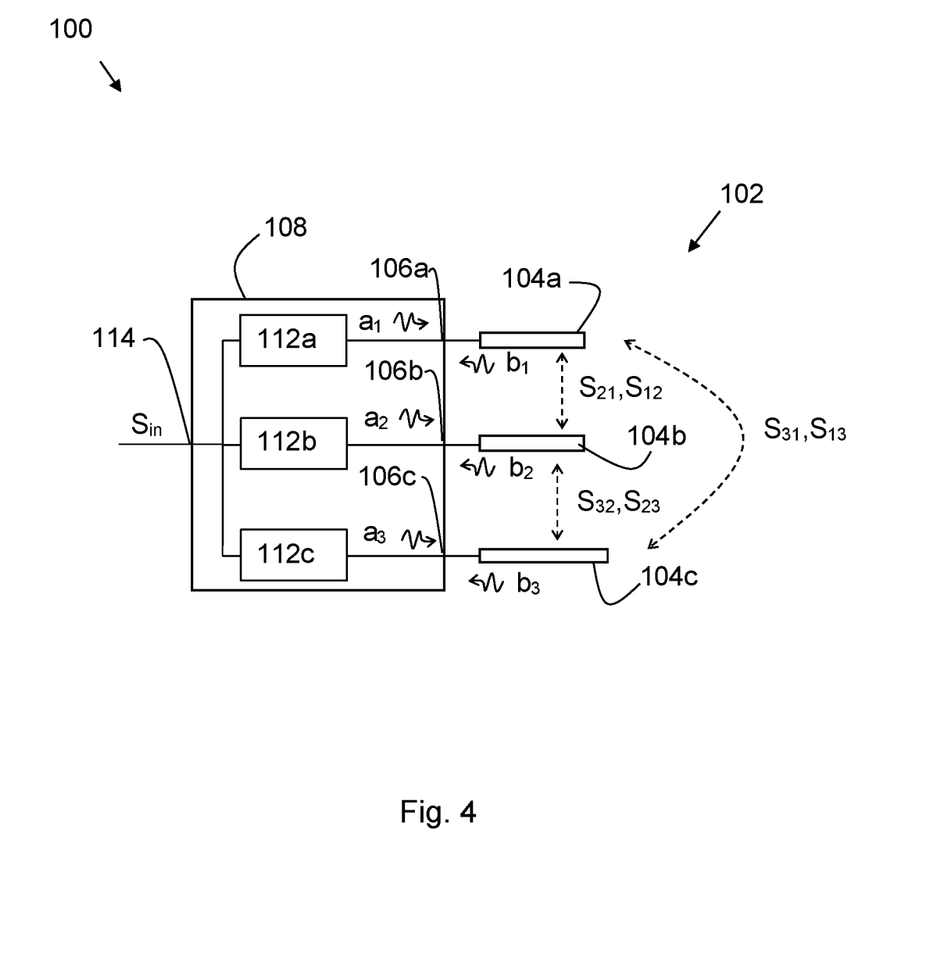
FIG. 4 shows schematically an antenna arrangement according to a further embodiment.

The first feed signal $a_1$, the second feed signal $a_2$, the third feed signal $a_3$, and the scattering parameters $S_{12}$, $S_{13}$, $S_{21}$, $S_{23}$, $S_{31}$, $S_{32}$ are illustrated in FIG. 4 which is described in detail below.

Figure 2:
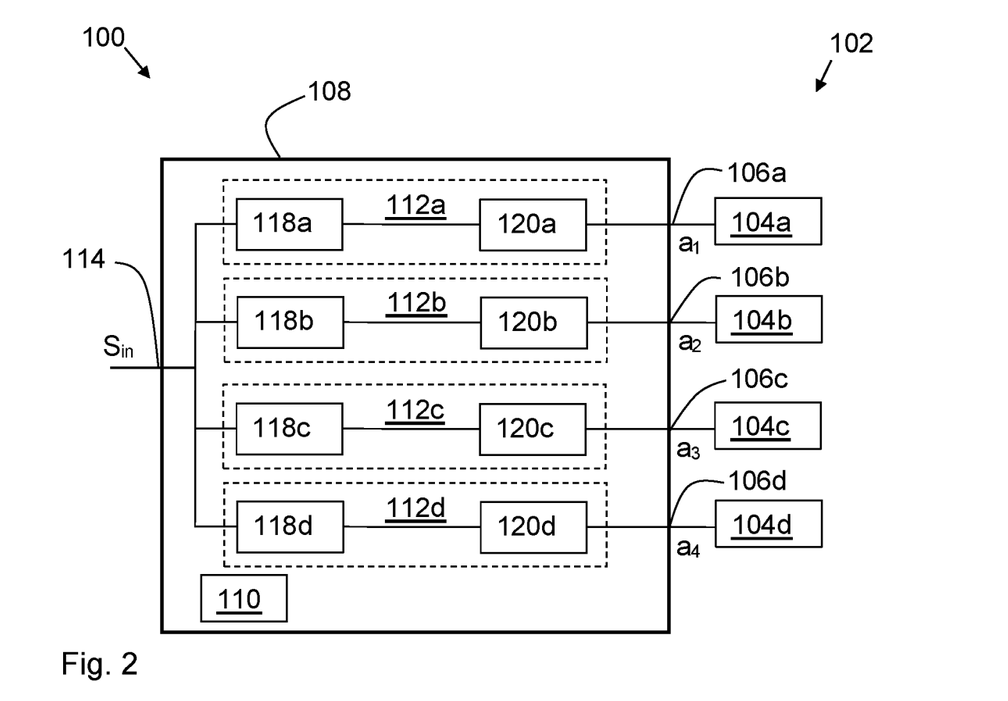
FIG. 2 shows schematically an antenna arrangement according to another embodiment.

FIG. 2 shows schematically an antenna arrangement 100 according to another embodiment. The antenna arrangement 100 comprises an antenna array 102 comprising a first antenna element 104a, a second antenna element 104b, a third antenna element 104c, and a fourth antenna element 104d. The antenna arrangement 100 also comprises a signal processing device 108. The signal processing device 108 comprises an input 114 configured to receive an input signal Sin. The signal processing device 108 also comprises a first feed point 106a connected to the first antenna element 104a, a second feed point 106b connected to the second antenna element 104b, a third feed point 106c connected to the third antenna element 104c, and a fourth feed point 106d connected to the fourth antenna element 104d. The signal processing device 108 comprises a first transceiver 112a associated with the first feed point 106a, a second transceiver 112b associated with the second feed point 106b, a third transceiver 112c associated with the third feed point 106c, and a fourth transceiver associated with the fourth feed point 106d. The first transceiver 112a comprises a first modulator 118a and a first phase/amplitude shifter 120a. The second transceiver 112b comprises a second modulator 118b and a second phase/amplitude shifter 120b. The third transceiver 112c comprises a third modulator 118c and a third phase/amplitude shifter 120c. The fourth transceiver 112d comprises a fourth modulator 118a and a fourth phase/amplitude shifter 120a. Each transceiver 112a, 112b, 112c, and 112d, is connected to the input 114 and is configured to receive the input signal Sin.

The function of the transceivers will now be explained using the first transceiver 112a as an example. The function of the other transceivers 112b, 112c, 112d, is equivalent to the function of the first transceiver 112a. The signal processing device 108 is configured to obtain a carrier frequency $f_c$ and a first complex weight $w_1$. The first complex weight is retrieved from a memory 110. The first modulator 118a modulates the input signal Sin to the carrier frequency $f_c$. The first phase/amplitude shifter 120a multiplies the modulated input signal with the first complex weight $w_1$ to provide the first feed signal $a_1$, which is then fed to the first antenna element 104a from the first feed point 106a. The second transceiver 112b, the third transceiver 112c, and the fourth transceiver 112d work in the corresponding way. It is of course possible to change place on the first modulator 118a and the first phase/amplitude shifter 120a. Correspondingly, it is possible to change place on the modulator 118b, 118c, 118d, and the corresponding phase/amplitude shifter 120b, 120c, 120d, in each one of the second transceiver 112b, the third transceiver 112c, and the fourth transceiver 112d.

Figure 3:
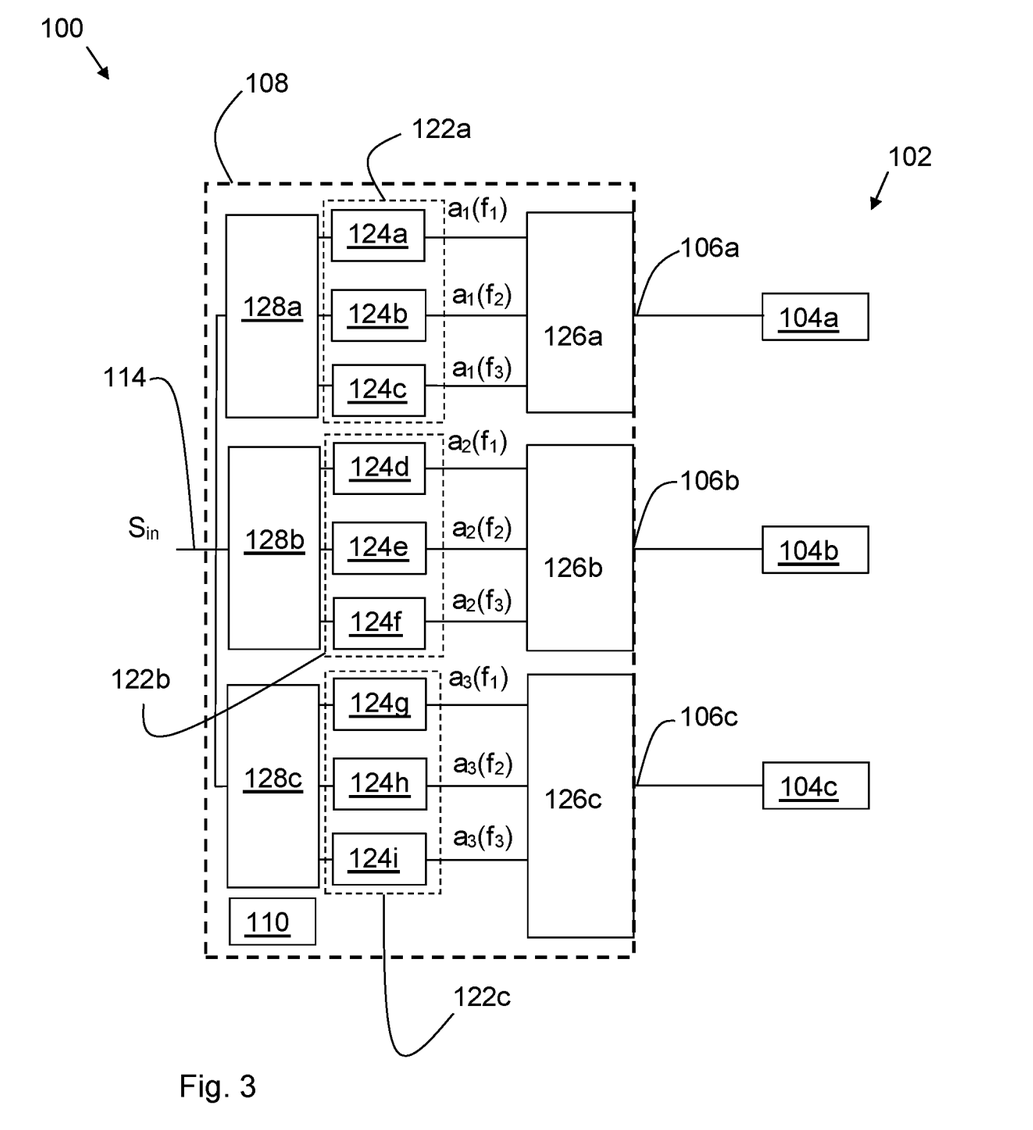
FIG. 3 shows schematically an antenna arrangement according to another embodiment.

FIG. 3 shows schematically an antenna arrangement 100 according to a further embodiment. The antenna arrangement 100 comprises an antenna array 102 comprising a first antenna element 104a, a second antenna element 104b, and a third antenna element 104c. The antenna arrangement 100 also comprises a signal processing device 108. The signal processing device 108 comprises an input 114 configured to receive an input signal Sin. The signal processing device 108 comprises a first input multiplexer 128a, a second input multiplexer 128b and a third input multiplexer 128c. The first input multiplexer 128a, the second input multiplexer 128b and the third input multiplexer 128c are all connected to the input 114. The signal processing device 108 also comprises a first feed point 106a connected to the first antenna element 104a, a second feed point 106b connected to the second antenna element 104b, and a third feed point 106c connected to the third antenna element 104c. The antenna arrangement comprises a first transceiver group 122a, a second transceiver group 122b, and a third transceiver group 122c. The antenna arrangement also comprises a first multiplexer 126a including a first feed point 106b, a second multiplexer 126b including a second feed point 106b, and a third multiplexer 126c including a third feed point 106c.

The first transceiver group 122a comprises a first subtransceiver 124a for a first carrier frequency $f_1$, a second subtransceiver 124b for a second carrier frequency $f_2$, and a third subtransceiver 124c for a third carrier frequency $f_3$. The first input multiplexer 128a is connected to the first transceiver group 122a and is configured to divide the input signal Sin between the first subtransceiver 124a, the second subtransceiver 124b, and the third subtransceiver 124c. The first subtransceiver 124a, the second subtransceiver 124b, and the third subtransceiver 124c are all connected to the first multiplexer 126a. The first multiplexer 126a connects the first subtransceiver 124a, the second subtransceiver 124b and the third subtransceiver 124c to the first feed point 106a.

The second transceiver group 122b comprises a fourth subtransceiver 124d for a first carrier frequency $f_1$, a fifth subtransceiver 124e for a second carrier frequency $f_2$, and a sixth subtransceiver 124c for a third carrier frequency $f_3$. The second input multiplexer 128b is connected to the second transceiver group 122b and is configured to divide the input signal Sin between the fourth subtransceiver 124d, the fifth subtransceiver 124e, and the sixth subtransceiver 124f. The fourth subtransceiver 124d, the fifth subtransceiver 124e, and the sixth subtransceiver 124f are all connected to the second multiplexer 126b. The second multiplexer 126b connects the fourth subtransceiver 124d, the fifth subtransceiver 124e and the sixth subtransceiver 124f at a time to the second feed point 106b.

The third transceiver group 122c comprises a seventh subtransceiver 124g for a first carrier frequency $f_1$, an eighth subtransceiver 124h for a second carrier frequency $f_2$, and a ninth subtransceiver 124i for a third carrier frequency $f_3$. The third input multiplexer 128c is connected to the third transceiver group 122c and is configured to divide the input signal Sin between the seventh subtransceiver 124g, the eighth subtransceiver 124h, and the ninth subtransceiver 124i. The seventh subtransceiver 124g, the eighth subtransceiver 124h, and the ninth subtransceiver 124i are all connected to the third multiplexer 126c. The third multiplexer 126c connects the seventh subtransceiver 124g, the eighth subtransceiver 124h and the ninth subtransceiver 124i at a time to the third feed point 106c.

The operation of the antenna arrangement 100 in FIG. 3 will now be described. An input signal Sin is inputted to all of the first input multiplexer 128a, the second input multiplexer 128b and the third input multiplexer 128c. The first input multiplexer 128a divides the input signal Sin between the first subtransceiver 124a, the second subtransceiver 124b and the third subtransceiver 124c. The second input multiplexer 128b divides the input signal Sin between the fourth subtransceiver 124d, the fifth subtransceiver 124e, and the sixth subtransceiver 124f. The third input multiplexer 128c divides the input signal Sin between the seventh subtransceiver 124g, the eighth subtransceiver 124h and the ninth subtransceiver 124i. The signal processing unit 108 will retrieve all relevant complex weights $w_1$, $w_2$, $w_3$, from the memory 110.

In the first transceiver group 122a, the first subtransceiver 124a modulates the input signal to the first carrier frequency $f_1$ and multiplies the modulated input signal Sin with the first complex weight $w_{1,f1}$, for the first carrier frequency $f_1$ to provide the first feed signal $a_1(f_1)$. The second subtransceiver 124b modulates the input signal Sin to the second carrier frequency $f_2$ and multiplies the modulated input signal Sin with the first complex weight $w_{1/1}$, for the second carrier frequency $f_2$, to provide the first feed signal $a_1(f_2)$. The third subtransceiver 124c modulates the input signal Sin to the third carrier frequency $f_3$ and multiplies the modulated input signal Sin with the first complex weight $w_{1/3}$, for the third carrier frequency $f_3$ to provide the first feed signal $a_1(f_3)$.

In the second transceiver group 122b, the fourth subtransceiver 124d modulates the input signal Sin to the first carrier frequency $f_1$ and multiplies the modulated input signal Sin with the second complex weight $w_{2/1}$, for the first carrier frequency $f_1$ to provide the second feed signal $a_2(f_1)$. The fifth subtransceiver 124e modulates the input signal Sin to the second carrier frequency $f_2$ and multiplies the modulated input signal Sin with the second complex weight $w_{2/2}$, for the second carrier frequency $f_2$, to provide the second feed signal $a_2(f_2)$. The sixth subtransceiver 124f modulates the input signal Sin to the third carrier frequency $f_3$ and multiplies the modulated input signal Sin with the second complex weight $w_{2/3}$, for the third carrier frequency $f_3$, to provide the second feed signal $a_2(f_3)$.

In the third transceiver group 122c, the seventh subtransceiver 124g modulates the input signal Sin to the first carrier frequency $f_1$ and multiplies the modulated input signal with the third complex weight $w_{3/1}$, for the first carrier frequency $f_1$ to provide the third feed signal $a_3(f_1)$. The eighth subtransceiver 124h modulates the input signal to the second carrier frequency $f_{c2}$ and multiplies the modulated input signal with the third complex weight $w_{3/2}$, for the second carrier frequency $f_2$ to provide the third feed signal $a_3(f_2)$. The ninth subtransceiver 124i modulates the input signal Sin to the third carrier frequency $f_3$ and multiplies the modulated input signal with the second complex weight $w_{3/3}$, for the third carrier frequency $f_3$, to provide the third feed signal $a_3(f_3)$.

The first multiplexer 126a, the second multiplexer 126b, and the third multiplexer 126c combine the feed signals from the subtransceivers 124a-i to which they are connected. Thus, the first multiplexer 126a combines the first feed signal $a_1(f_1)$ for the first carrier frequency $f_1$, the first feed signal $a_1(f_2)$ for the second carrier frequency $f_2$ and the first feed signal $a_1(f_3)$ for the third carrier frequency $f_3$, and feeds the combined signal to the first antenna element 104a. The second multiplexer 126b combines the second feed signal $a_2(f_1)$ for the first carrier frequency $f_1$, the second feed signal $a_2(f_2)$ for the second carrier frequency $f_2$ and the second feed signal $a_2(f_3)$ for the third carrier frequency $f_3$, and feeds the combined signal to the second antenna element 104b. Finally, the third multiplexer 126c combines the third feed signal $a_3(f_1)$ for the first carrier frequency $f_1$, the third feed signal $a_3(f_2)$ for the second carrier frequency $f_2$ and the third feed signal $a_3(f_3)$ for the third carrier frequency $f_3$, and feeds the combined signal to the third antenna element 104c.

FIG. 4 shows schematically an antenna arrangement 100 according to a further embodiment. The antenna arrangement 100 comprises an antenna array 102 comprising a first antenna element 104a, a second antenna element 104b, and a third antenna element 104c. The antenna arrangement 100 also comprises a signal processing device 108. The signal processing device 108 comprises an input 114 configured to receive an input signal Sin. The signal processing device 108 also comprises a first feed point 106a connected to the first antenna element 104a, a second feed point 106b connected to the second antenna element 104b, and a third feed point 106c connected to the third antenna element 104c. The signal processing device 108 comprises a first transceiver 112a associated with the first feed point 106a, a second transceiver 112b associated with the second feed point 106b, a third transceiver 112c associated with the third feed point 106c. The dotted double arrow denoted $S_{21}$, $S_{12}$, illustrates the coupling between the first antenna element 104a and the second antenna element 104b. The dotted double arrow denoted $S_{32},S_{23}$, illustrates the coupling between the second antenna element 104b and the third antenna element 104c. The dotted double arrow denoted $S_{21},S_{12}$, illustrates the coupling between the first antenna element 104a and the second antenna element 104b. The first feed signal $a_1$, the second feed signal $a_2$, and the third feed signal $a_3$, are fed from the first transceiver 112a, the second transceiver 112b, and the third transceiver 112c, respectively. A first return signal $b_1$, a second return signal $b_2$, and a third return signal $b_3$ are directed towards the first transceiver 112a, the second transceiver 112b, and the third transceiver 112c, from the first antenna element 104a, the second antenna element 104b, and the third antenna element 104c, respectively. During the measurement of the scattering parameters $S_{ij}$, only one antenna element at a time is provided with a feed signal. Thus, when only the first antenna element 104a is fed with a first feed signal $a_1$, the first return signal $b_1$ at the first feed point 106a is equal to $b_1=S_{11}a_1$, the second return signal $b_2$ at the second feed point 106b is equal to $b_2=S_{21}a_1$, and the third return signal $b_3$ at the third feed point 106c is equal to $b_3=S_{31}a_1$. When all feed points 106a, 106b, 106c are fed with a respective feed signal $a_1$, $a_2$, $a_3$, the first return signal $b_1$ at the first feed point 106a is equal to $b_1=S_{11}a_1+S_{12}a_2+S_{13}a_3$, the second return signal $b_2$ at the second feed point 106b is equal to $b_2=S_{21}a_1+S_{22}a_2+S_{23}a_3$, and the third return signal $b_3$ at the third feed point 106c is equal to $b_3=S_{31}a_1+S_{32}a_2+S_{33}a_3$. The design of the first antenna element 104a, the second antenna element 104b, and the third antenna element 104c, and the antenna arrangement as such may vary. The scattering parameters will depend on the physical properties of the antenna arrangement.

Figure 5A:
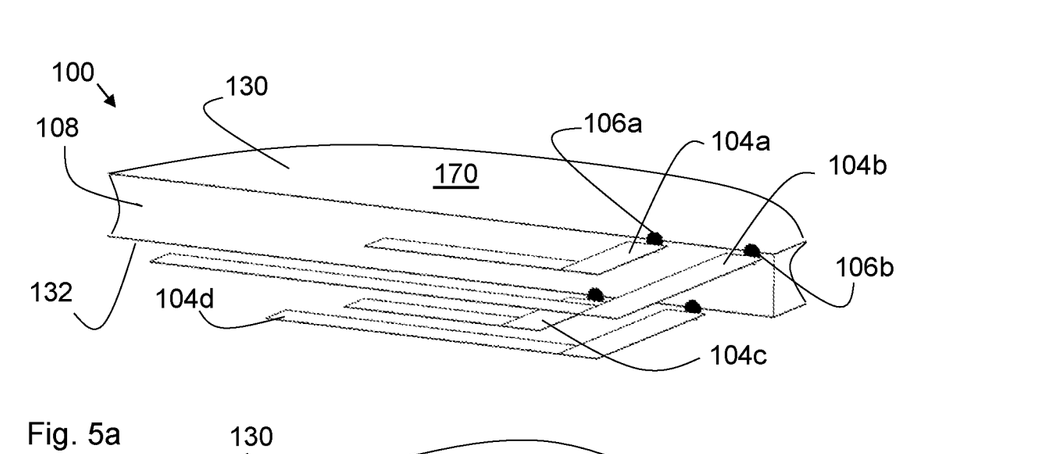
FIG. 5a is a perspective view of a part of an antenna arrangement according to a further embodiment.
Figure 5B:
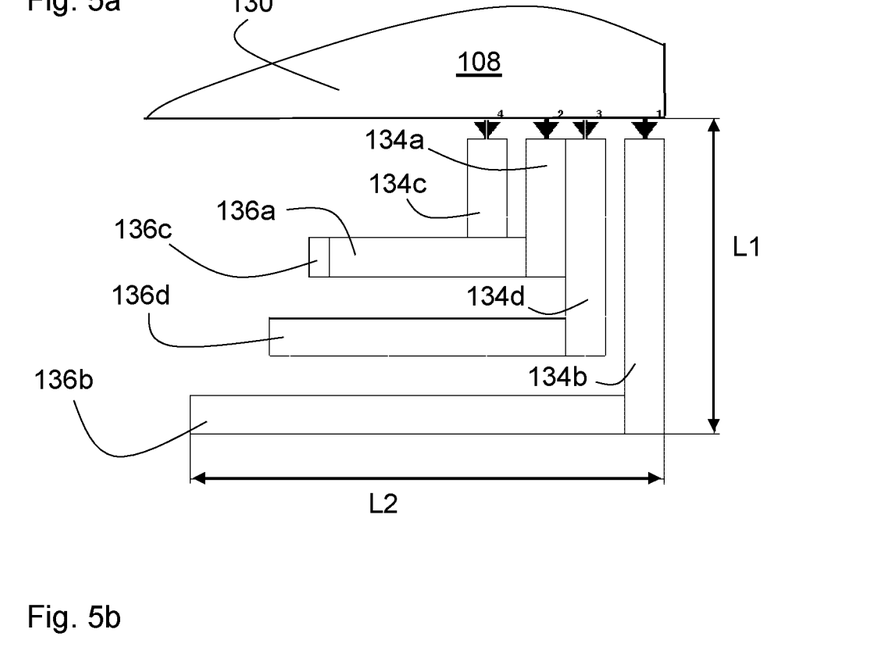

FIG. 5a is a perspective view of a part of an antenna arrangement 100 according to a further embodiment. FIG. 5b is a plan view of the antenna arrangement 100 shown in FIG. 5a. The antenna arrangement 100 comprises an antenna array 102 comprising a first antenna element 104a, a second antenna element 104b, a third antenna element 104c, and a fourth antenna element 104d. The antenna arrangement 100 also comprises a signal processing device 108. The signal processing device 108 comprises an input 114 configured to receive an input signal Sin. The signal processing device 108 also comprises a first feed point 106a connected to the first antenna element 104a, a second feed point 106b connected to the second antenna element 104b, a third feed point 106c connected to the third antenna element 104c, and a fourth feed point 106d connected to the fourth antenna element 104d. As can be seen in FIG. 5a the signal processing device 108 comprises printed circuit board (PCB) 170 having a top plane 130 and a bottom plane 132. The first antenna element 104a and the second antenna element 104b extend from the top plane 130 of the signal processing device 108, while the third antenna element 104c, and the fourth antenna element 104d extend from the bottom plane 132. The first antenna element 104a, a second antenna element 104b, a third antenna element 104c, and a fourth antenna element 104d all have a bent shape with a first part 134a, 134b, 134c, 134d extending from the signal processing device and a second part 136a, 136b, 136c, 136d extending at a right angle from the first part 134a, 134b, 134c, 134d. In FIG. 5b a top view is shown in which the length of the largest of the first parts 134*a*, 134*b*, 134*c*, 134*d* is denoted L1 and the length of the largest of the second parts 136*a*, 136*b*, 136*c*, 136*d* is denoted L2. The antenna elements 104*a*, 104*b*, 104*c*, 104*d* could for example also be implemented as wire traces on the PCB 170 (e.g. on the top plane 130 and the bottom plane 132).

Figure 6:
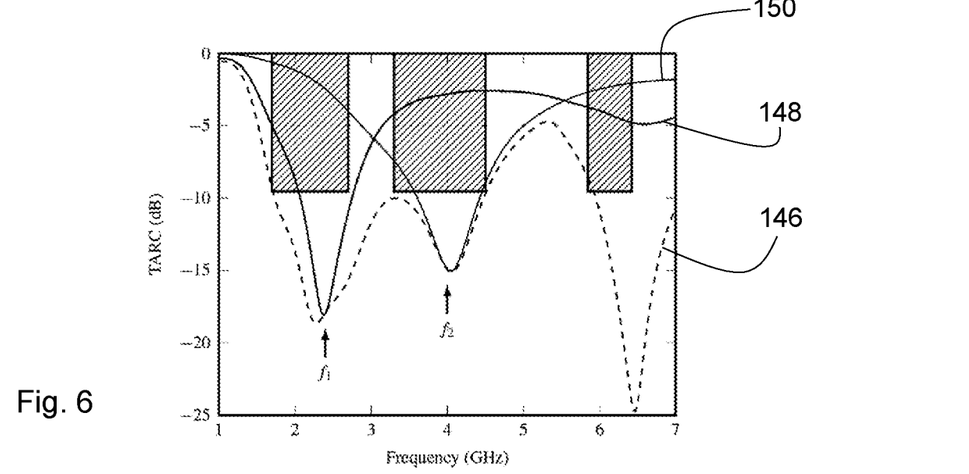
FIG. 6 shows schematically the efficiency as a function of the frequency for an antenna arrangement according to FIG. 3.
Figure 7:
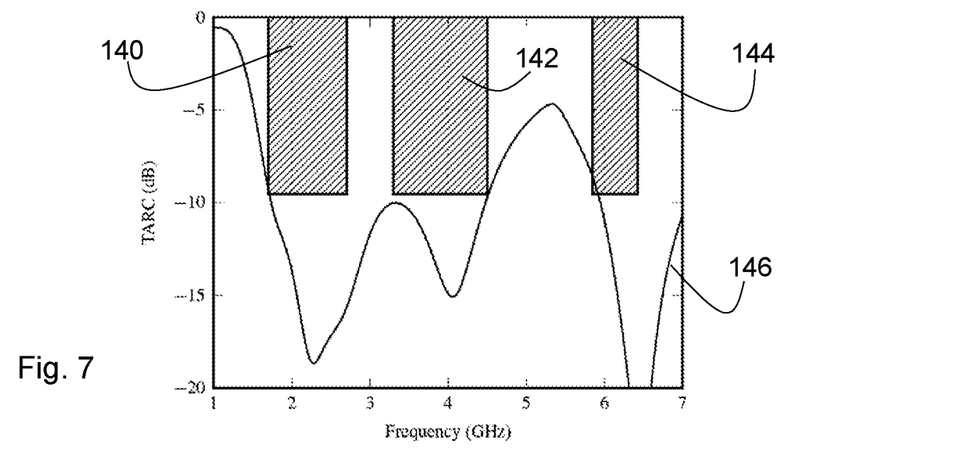
FIG. 7 shows schematically the efficiency as a function of the frequency for an antenna arrangement according to FIG. 3.

FIG. 6 shows schematically the efficiency as a function of the frequency for an antenna arrangement according to FIG. 3. FIG. 7 shows schematically the efficiency as a function of the frequency for an antenna arrangement according to FIG. 3. The x-axis shows the frequency in GHZ and the y-axis the TARC (total active reflection coefficient) in dB.

In FIG. 7 the shaded areas 140, 142, and 144, show the specifications to be fulfilled by the antenna arrangement. The solid line 146 shows the obtainable efficiency using the antenna arrangement 100. The first shaded area 140 corresponds to the low band (1.7-2.7 GHz). The second shaded area 142 corresponds to the mid band (3.3-4.5 GHz). The third shaded area 144 corresponds to the high band (5.8-6.4 GHz). The criterion for the operation is approximately >90% matching efficiency (corresponding to <−10 dB at the desired frequencies). FIG. 6 illustrates the case that the antenna arrangement is used to transmit in two bands simultaneously using a first carrier frequency $f_1$ in the low band and a second carrier frequency $f_2$ in the mid band. Assuming that the scattering matrix S is known for each frequency the complex weights at those frequencies may be calculated as explained above. Using the complex weights calculated based on the first frequency $f_1$ results in an efficiency as a function of the frequency shown by the first solid line 148 in FIG. 6. Using the complex weights calculated based on the second frequency $f_2$ results in an efficiency as a function of the frequency shown by the second solid line 150 in FIG. 7 The dotted line 146 shows the theoretically obtainable efficiency using the antenna arrangement 100. The efficiency is shown as TARC(dB) which is the total active reflection coefficient. TARC may be calculated using the following formula $$TARC = \frac{\sqrt{b^H b}}{\sqrt{a^H a}},$$

where TARC relates to efficiency r via the relation $\eta = 1 - (TARC).$

Figure 8:
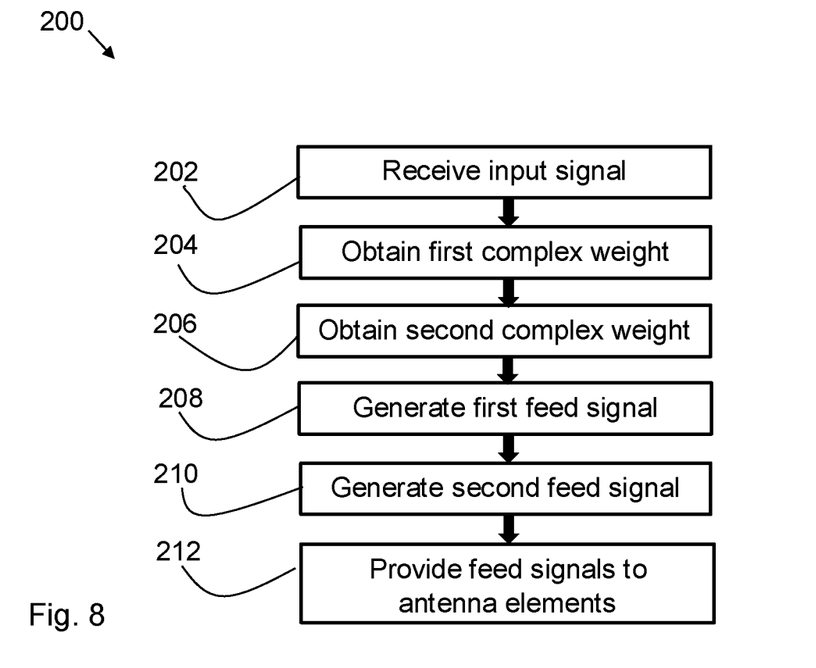
FIG. 8 is a flow diagram illustrating a method according to an embodiment.

FIG. 8 is a flow diagram illustrating a method 200 according to an embodiment. The method 200 is for an antenna arrangement 100 comprising an antenna array 102 comprising a first antenna element 104*a* including a first feed point 106*a*, and a second antenna element 104*b* including a second feed point 106*b*. The method 200 comprises receiving 202 an input signal Sin, obtaining 204 a first complex weight $w_1$, and obtaining 206 a second complex weight $w_2$. The first complex weight $w_1$, and the second complex weight $w_2$ are, according to an embodiment obtained from the memory 110. The method 200 also comprises generating 208 a first feed signal $a_1$ based on the input signal Sin and the first complex weight $w_1$, generating 210 a second feed signal $a_2$ based on the input signal Sin and the second complex weight $w_2$, and providing 212 the first feed signal $a_1$ to the first feed point 106*a* and providing the second feed signal $a_2$ to the second feed point 106*b* so as to control the frequency characteristic of the antenna array 102.

Figure 9:
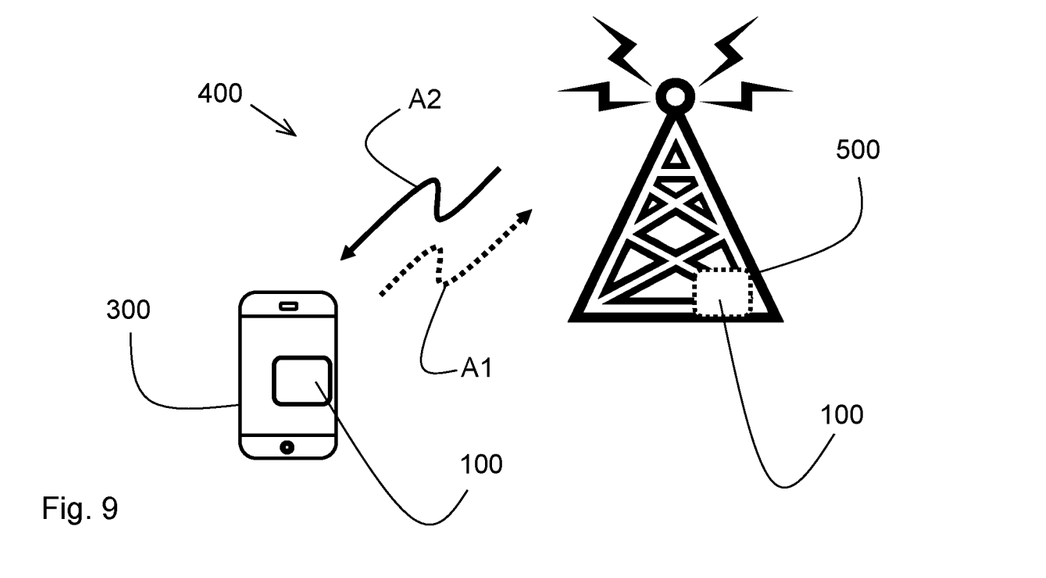
FIG. 9 shows schematically a communication device in a wireless communication system.

FIG. 9 shows schematically a communication device 300 in a wireless communication system 400. The communication device 300 comprises an antenna arrangement 100 according to an embodiment of the invention. The wireless communication system 400 also comprises a base station 500 which may also comprise an antenna arrangement 100 according to any one of the embodiments described above. The dotted arrow A1 represents transmissions from the transmitter device 300 to the base station 500, which are usually called up-link transmissions. The full arrow A2 represents transmissions from the base station 500 to the transmitter device 300, which are usually called down-link transmissions.

The present transmitter device 300 may be any of a User Equipment (UE) in Long Term Evolution (LTE), mobile station (MS), wireless terminal or mobile terminal which is enabled to communicate wirelessly in a wireless communication system, sometimes also referred to as a cellular radio system. The UE may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM).

The present transmitter device 300 may also be a base station a (radio) network node or an access node or an access point or a base station, e.g., a Radio Base Station (RBS), which in some networks may be referred to as transmitter, "eNB", "eNodeB", "NodeB" or "B node", depending on the technology and terminology used. The radio network nodes may be of different classes such as, e.g., macro eNodeB, home eNodeB or pico base station, based on transmission power and thereby also cell size. The radio network node can be a Station (STA), which is any device that contains an IEEE 802.11-conformant Media Access Control (MAC) and Physical Layer (PHY) interface to the Wireless Medium (WM).

What is claimed is:

1. An antenna arrangement, comprising:
an antenna array comprising
a first antenna element including a first feed point, and
a second antenna element including a second feed point, wherein the first antenna element and the second antenna element have different physical dimensions; and
a signal processing device configured to:
receive an input signal (Sin),
obtain a first complex weight (w1),
obtain a second complex weight (w2), wherein w1 and w2 are based on an electromagnetic scattering between the first antenna element and the second antenna element,
generate a first feed signal (a1) based on Sin and w1,
generate a second feed signal (a2) based on Sin and w2,
provide a1 to the first feed point and provide a2 to the second feed point, wherein a1 and a2 cause control of the frequency characteristic of the antenna array, and
determine the electromagnetic scattering by determining corresponding scattering parameters based upon provided first and second pilot signals and received first and second pilot return signals at the first and second feed points.

2. The antenna arrangement according to claim 1, wherein a1 and a2 differ only in phase and amplitude.

3. The antenna arrangement according to claim 1, wherein a1 and a2 comprise a common carrier frequency (fc), and wherein w1 and w2 depend on fc.

4. The antenna arrangement according to claim 3, wherein a mutual distance (d) between the first antenna element and the second antenna element is smaller than a wavelength of fc.

5. The antenna arrangement according to claim 1, wherein the signal processing device to determine the electromagnetic scattering by determining corresponding scattering parameters based upon provided first and second pilot signals and received first and second pilot return signals at the first and second feed points, is configured to
provide a first pilot signal (a1$p$) to the first feed point and receive first pilot return signals (b1$p$) at the first feed point and the second feed point,
provide a second pilot signal (a2$p$) to the second feed point and receive second pilot return signals (b2$p$) at the first feed point and the second feed point,
determine the electromagnetic scattering by determining corresponding scattering parameters (S11, S12, S21, and S22) based on a1$p$, a2$p$, b1$p$, and b2$p$.

6. The antenna arrangement according to claim 5,
wherein provision of a1 to the first feed point and a2 to the second feed point results in a first return signal (b1) at the first feed point and a second return signal (b2) at the second feed point, wherein b1 and b2 are determined by S11, S12, S21, and S22, and
wherein the signal processing device is configured to choose w1 and w2, and thereby a1 and a2, wherein a1 and a2 cause the sum of b1 and b2 is below a predetermined threshold value.

7. The antenna arrangement according to claim 5, wherein the signal processing device is configured to provide a1$p$ and a2$p$ in different time periods.

8. The antenna arrangement according to claim 1, wherein the signal processing device is configured to retrieve w1 and w2 from a memory.

9. The antenna arrangement according to claim 1, wherein the first antenna element and the second antenna element each has a length in the interval 5 mm to 100 mm, and preferably in the interval 10 mm to 50 mm.

10. The antenna arrangement according to claim 1, wherein the signal processing device comprises
at least a first transceiver associated with the first feed point, and
a second transceiver associated with the second feed point.

11. The antenna arrangement according to claim 1, wherein the signal processing device comprises
a printed circuit board having a top plane and a bottom plane, wherein the first antenna element extends from the top plane and the second antenna element extends from the bottom plane.

12. A method for an antenna arrangement comprising an antenna array comprising a first antenna element having a first feed point and a second antenna element having a second feed point, the method comprising:
receiving an input signal (Sin),
obtaining a first complex weight (w1),
obtaining a second complex weight (w2), wherein w1 and w2 are based on an electromagnetic scattering between the first antenna element and the second antenna element,
generating a first feed signal (a1) based on Sin and w1,
generating a second feed signal (a2) based on Sin and w2,
providing a1 to the first feed point and providing a2 to the second feed point, wherein a1 and a2 cause control of the frequency characteristic of the antenna array, and
determine the electromagnetic scattering by determining corresponding scattering parameters based upon provided first and second pilot signals and received first and second pilot return signals at the first and second feed points.

13. A non-transitory computer readable storage medium storing instructions executable by a computing system, when executed by the computing system, the instructions cause the computing system to perform a method of an antenna arrangement, the antenna arrangement comprising an antenna array comprising a first antenna element having a first feed point and a second antenna element having a second feed point, the method comprising:
receiving an input signal (Sin),
obtaining a first complex weight (w1),
obtaining a second complex weight (w2),
generating a first feed signal (a1) based on Sin and w1,
generating a second feed signal (a2) based on Sin and w2, wherein w1 and w2 are based on an electromagnetic scattering between the first antenna element and the second antenna element,
providing a1 to the first feed point and providing a2 to the second feed point, wherein a1 and a2 cause control of the frequency characteristic of the antenna array,
determine the electromagnetic scattering by determining corresponding scattering parameters based upon provided first and second pilot signals and received first and second pilot return signals at the first and second feed points.

* * * * *